(12) United States Patent
Bilbo et al.

(10) Patent No.: US 12,472,238 B2
(45) Date of Patent: Nov. 18, 2025

(54) PORCINE COLLAGEN COMPOSITIONS AND METHODS OF USE THEREOF

(71) Applicant: Organogenesis Inc., Canton, MA (US)

(72) Inventors: Patrick Bilbo, Plymouth, MA (US); Katherine Faria, Middleboro, MA (US); Bonnie Kathleen Mowry, Birmingham, AL (US); Vivek Raut, Ashland, MA (US)

(73) Assignee: Organogenesis Inc., Canton, MA (US)

( * ) Notice: Subject to any disclaimer, the term of this patent is extended or adjusted under 35 U.S.C. 154(b) by 0 days.

(21) Appl. No.: 17/869,614

(22) Filed: Jul. 20, 2022

(65) Prior Publication Data

US 2024/0024429 A1      Jan. 25, 2024

Related U.S. Application Data

(60) Provisional application No. 63/224,209, filed on Jul. 21, 2021.

(51) Int. Cl.
*A61K 38/39* (2006.01)
*A61K 45/06* (2006.01)
*A61L 15/44* (2006.01)
*A61L 26/00* (2006.01)

(52) U.S. Cl.
CPC .............. *A61K 38/39* (2013.01); *A61K 45/06* (2013.01); *A61L 15/44* (2013.01); *A61L 26/0066* (2013.01); *A61L 2300/404* (2013.01)

(58) Field of Classification Search
CPC ............................ A61K 38/014; A61K 38/39
See application file for complete search history.

(56) References Cited

U.S. PATENT DOCUMENTS

| | | | |
|---|---|---|---|
| 4,891,359 A | 1/1990 | Saferstein et al. | |
| 4,925,924 A * | 5/1990 | Silver | A61L 26/0033 530/356 |
| 6,893,653 B2 | 5/2005 | Abraham et al. | |
| 2011/0262503 A1 | 10/2011 | Ingram et al. | |
| 2012/0135045 A1 | 5/2012 | Nixon et al. | |
| 2016/0106674 A1 * | 4/2016 | Scalesciani | A61K 9/0014 424/641 |
| 2016/0303281 A1 | 10/2016 | Salamone et al. | |
| 2016/0317625 A1 * | 11/2016 | Dicosmo | A61L 15/425 |
| 2017/0333346 A1 * | 11/2017 | Burnam | A61K 47/06 |
| 2018/0353654 A1 | 12/2018 | Reves et al. | |
| 2019/0062567 A1 * | 2/2019 | Kaufold | C08L 3/08 |
| 2020/0040030 A1 * | 2/2020 | Wang | A61L 27/3654 |

FOREIGN PATENT DOCUMENTS

WO     WO 2016/061219 A1     4/2016

OTHER PUBLICATIONS

Mathew-Steiner et al (Bioengineering, 2021, vol. 8, pp. 1-15) (Year: 2021).*
Bozec et al (Biophysical Journal, 2011, vol. 101, pp. 228-236) (Year: 2011).*
Wang et al (ACS Omega, Aug. 8, 2020, vol. 5, pp. 20238-20249) (Year: 2020).*
PuraPlyAM (Organogenesis, Revision date Jan. 2020, https://puraplyam.com/pdf/PuraPly-Antimicrobial-Package-Insert.pdf) (Year: 2020).*
Asaad (Wounds UK, Collagen dressings made easy, Mar. 20, 2012, https://wounds-uk.com/made-easy/collagen-dressings-made-easy/) (Year: 2012).*
McKeen (Plastics Design Library, 2012, pp. 1-40) (Year: 2012).*
AcuityIP (PTAB doubles down on Natural Products Doctrine in Human Milk case, Dec. 23, 2024, https://www.acuityip.com/ptab-affirms-%C2%A7101-rejection-of-human-milk-product-claims/) (Year: 2024).*
International Search Report dated Jan. 20, 2023 in Int'l Appln. PCT/US2022/073957.
Berge et al., "Pharmaceutical salts," *J. Pharm. Sci.* 66(1), pp. 1-19 (Jan. 1997) (Amsterdam, The Netherlands).
Extended European Search Report dated Apr. 15, 2025, issued in European Application 22846820.3.
Liu et al., "A porcine acellular dermal matrix induces human fibroblasts to secrete hyaluronic acid by activing JAK2/STAT3 signalling," *RSC Adv.* 10, pp. 18959-18969 (Jan. 2020) (electronic publication).
Shevchenko et al., "Use of a novel porcine collagen paste as a dermal substitute in full-thickness wounds," *Wound Rep. Reg.* 16, pp. 198-207 (Mar. 2008) (Hoboken, New Jersey, US).

\* cited by examiner

*Primary Examiner* — Mark V Stevens
(74) *Attorney, Agent, or Firm* — Arnold & Porter Kaye Scholer LLP

(57) ABSTRACT

The present disclosure provides compositions and methods related to wound management. The compositions include a micronized extracellular matrix and in some instances one or more antimicrobial agents. In some embodiments, the extracellular matrix is comprised of a porcine purified collagen wound matrix (CWM) and polyhexamethylene biguanide (PHMB). The composition is formulated as a powder and may be applied to a wound as a powder, or hydrated and applied to a wounds as a paste or a slurry.

23 Claims, 3 Drawing Sheets

PORCINE COLLAGEN COMPOSITIONS AND METHODS OF USE THEREOF

CROSS-REFERENCE TO RELATED APPLICATION

This application claims priority from U.S. Provisional Patent Application No. 63/224,209, filed Jul. 21, 2021, the contents of which is hereby incorporated by reference in its entirety.

FIELD

The present disclosure relates to micronized porcine collagen compositions for use in wound management.

BACKGROUND

Wounds present a common clinical challenge for both physicians and veterinarians. Broadly, wounds are comprised of acute injuries (e.g., trauma, burns, surgical wounds, radiation injuries) and chronic processes (e.g., ulcers, diabetic ulcers, venous stasis ulcers, pressure ulcers, abscesses) as well as irregularly shaped and tunnelling wounds.

Extracellular matrix (ECM) derived products are used widely to support wound management and are widely known to be well tolerated as a wound management modality. Extracellular matrices may be derived from either animals or humans and may include cellular components or be decellularized. ECMs consisting of placental based matrix, porcine intestinal collagen wound matrix (CWM), porcine urinary bladder matrix, among others are currently utilized clinically to support wound repair and healing. Collagen is structurally and functionally a key protein of the extracellular matrix which is known to play a role in the healing of connective tissues.

Irregularly shaped and tunnelling wounds are challenging to manage with standard available wound management modalities (most often supplied in a sheet). Micronizing the ECM to form an ECM powder yields a distinct clinical advantage, allowing for the powder to be applied to ensure direct contact of the product with the wound bed. Additionally, the powder may be hydrated and delivered in the form of a paste or a slurry.

Bacterial colonization and biofilm are known to be a major contributor to the chronicity of wounds. In one or more of the embodiments, the ECM powder has been designed to include an antimicrobial component, delivering both the benefits of the ECM and an antimicrobial to address the microbes, bacterial burden, or biofilm present within the wound bed.

SUMMARY

The present disclosure provides for, and includes, a micronized collagen composition comprising particles of a Collagen Wound Matrix (CWM) having an average particle size of 1000 micrometers (µm) or less in diameter, where the composition comprises greater than 95% (w/w) porcine collagen.

The present disclosure provides for, and includes, a method for managing a wound in a subject in need thereof comprising cleaning the wound of debris and necrotic tissue; and applying a micronized collagen composition to the entire area of the wound, where the composition comprises particles of a Collagen Wound Matrix (CWM) having an average particle size of 1000 micrometers (µm) or less in diameter, and where the composition comprises greater than 95% (w/w) porcine collagen.

The present disclosure provides for, and includes, a micronized collagen composition for use in the manufacture of a medicament for wound management, the composition comprising particles of a Collagen Wound Matrix (CWM) having an average particle size of 1000 micrometers (µm) or less in diameter, wherein the composition comprises greater than 95% (w/w) native porcine Type I collagen, less than 0.7% (w/w) lipids, less than 1.0% (w/w) glycosaminoglycans, and less than 0.1 nanograms per milliliter (ng/ml) DNA, where the native porcine Type I collagen is free of cells and cell remnants, and where the wounds are selected from the group consisting of partial thickness wounds, full-thickness wounds, pressure ulcers, venous ulcers, diabetic ulcers, chronic vascular ulcers, tunneled wounds, undermined wounds, surgical wounds, wound dehiscence, trauma wounds, second degree burns, and draining wounds.

The present disclosure provides for, and includes, a micronized collagen composition comprising particles of a Collagen Wound Matrix (CWM) having a particle size between 10 to 1200 micrometers (µm) in diameter, a porosity of between 55 to 95%, and a density of between 0.4 to 1.4 gram/milliliter (g/ml), where the composition comprises greater than 95% (w/w) porcine collagen.

BRIEF DESCRIPTION OF THE DRAWINGS

FIG. 1A is a plot of the particle size distribution of a wet Sample A. FIG. 1B is a plot of the particle size distribution of a dry Sample A. FIG. 1C is a plot of the particle size distribution of a dry Sample B.

DETAILED DESCRIPTION

A. Compositions and Methods

Figure 1A:
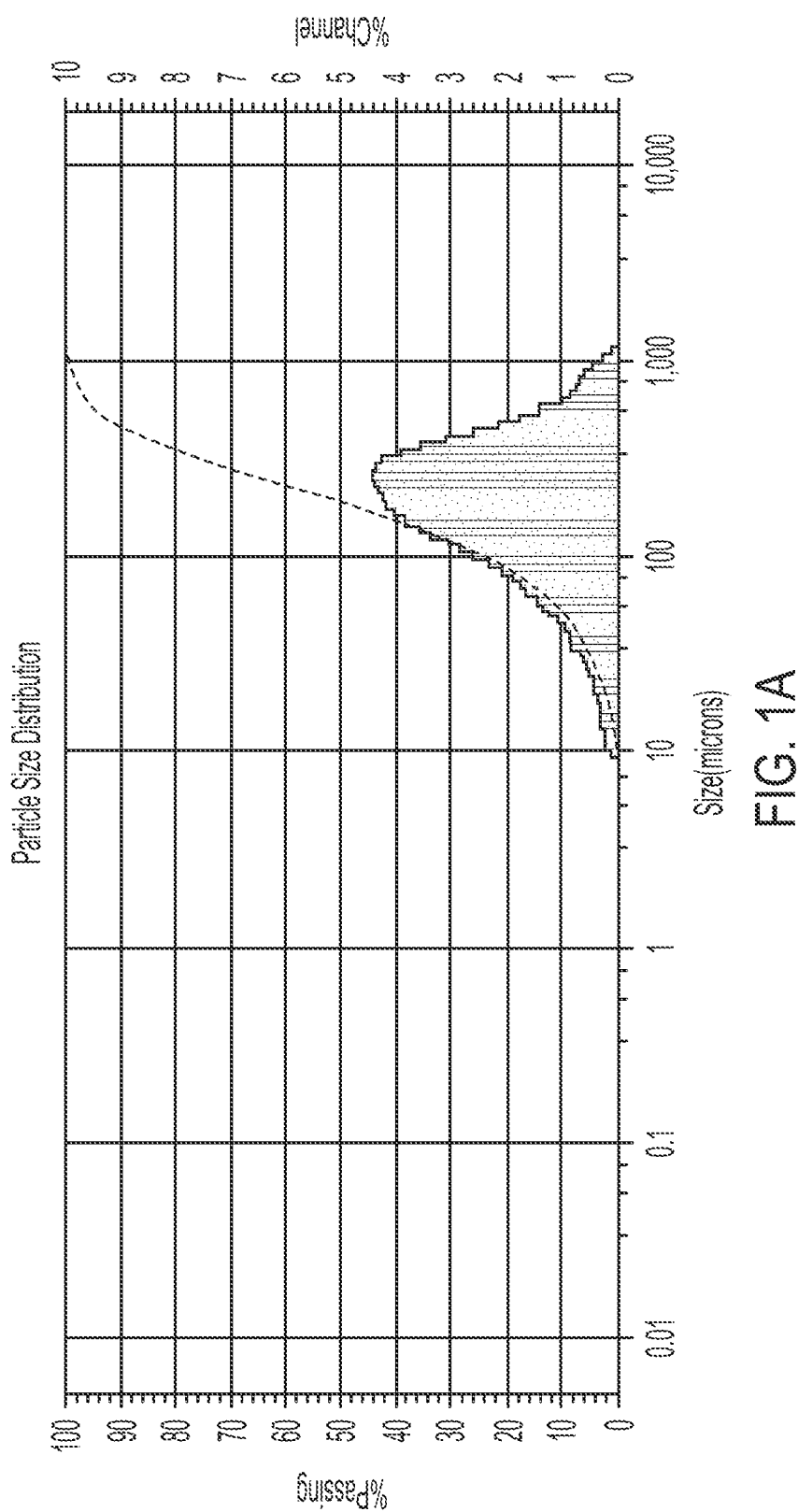
FIG. 1A to 1C are plots of particle size distributions of micronized collagen compositions prepared according to an embodiment according to Example 6.
Figure 1B:
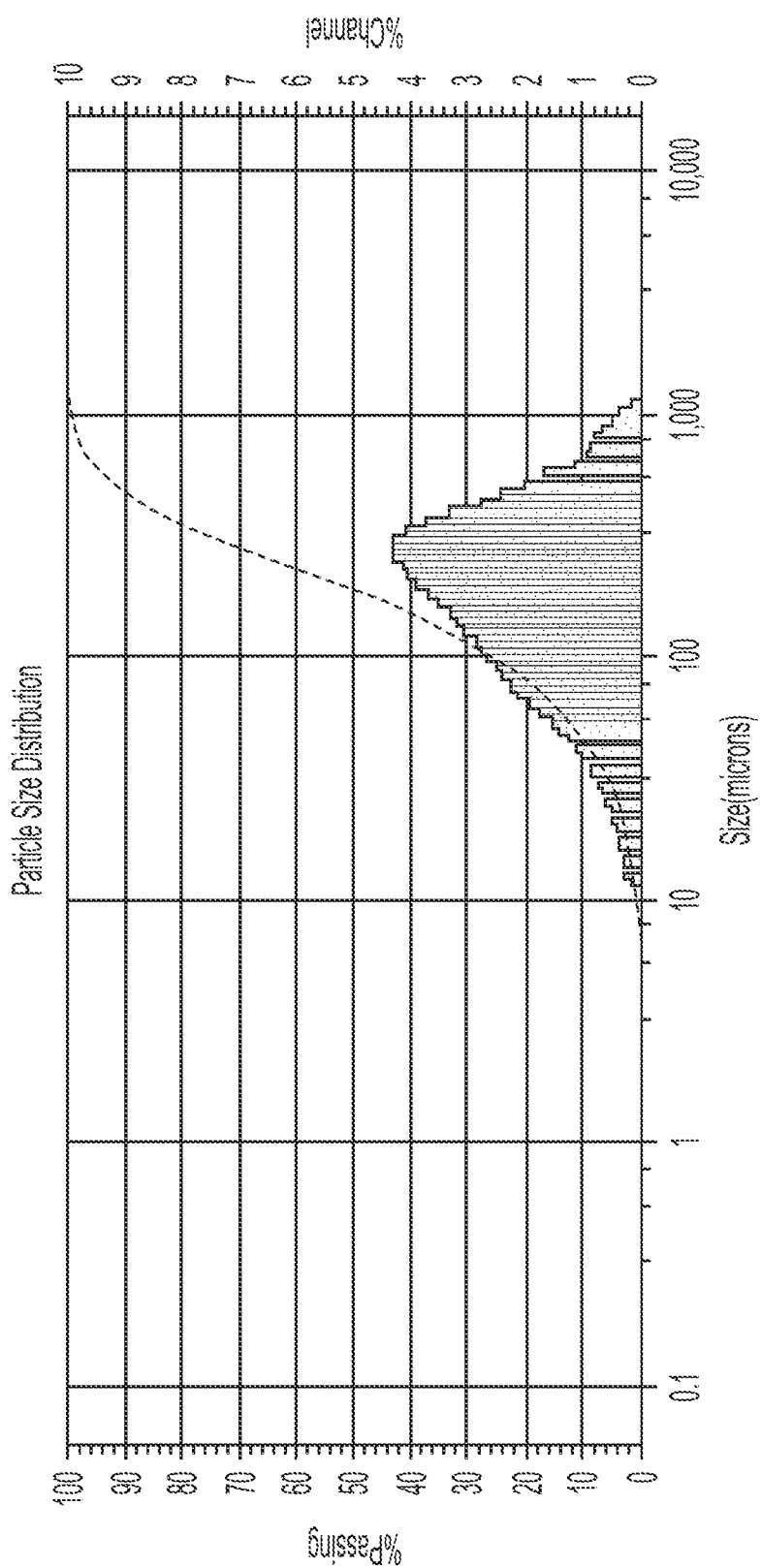
Figure 1C:
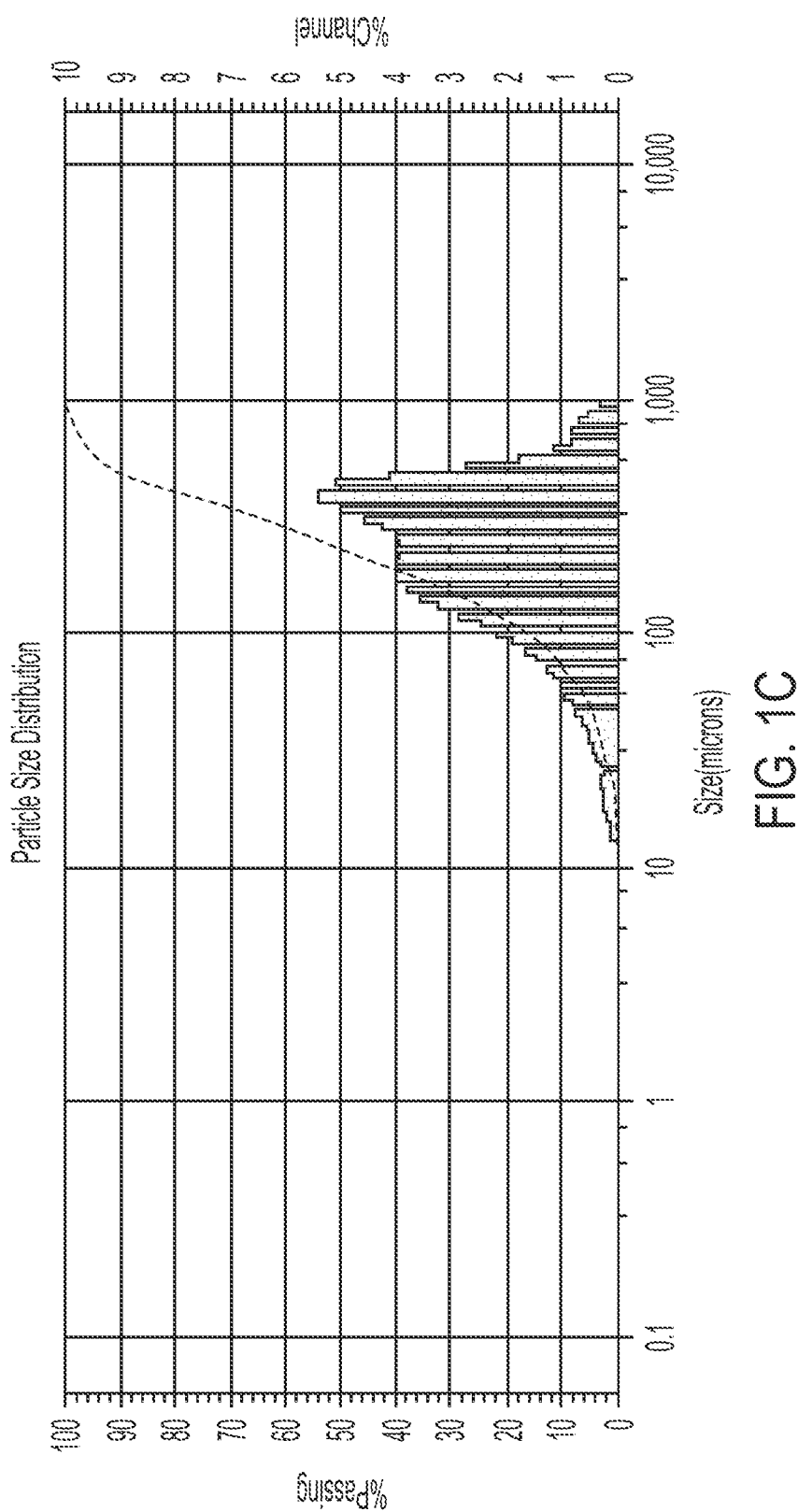

The present disclosure provides for, and includes, compositions comprising micronized particles of a Collagen Wound Matrix (CWM) having a particle size between 10 to $1200 \times 10^{-6}$ meters (micrometers, microns, or µm) diameter, a porosity of between 55 to 95%, and a density of between 0.4 to 1.4 gram/milliliter (g/ml). In aspects, the CWM comprises a porcine collagen. In aspects, the porcine collagen is free of cells and cell remnants. In further aspects, the CWM comprises porcine Type I collagen. In aspects, the CWM comprises native porcine Type I collagen.

The micronized particles of CWM according to the present disclosure comprise particles having a size of between 10 to 1200 µm diameter as determined using Laser Light Scattering Particle Sizing Analysis (LLSPSA). The disclosure further provides for micronized particles of CWM that have an average size of between 200 and 300 µm. In certain aspects, the micronized particles comprise fewer than 0.5% of particles having a diameter of greater than 1000 µm as determined by LLSPSA. In aspects of the present disclosure, the particles comprise flakes.

In aspects of the present disclosure, the micronized particles of a CWM are prepared from an intestinal collagen layer (ICL). In an aspect, the particles are prepared form a CWM comprising one or more layers of an ICL prior to micronization. In an aspect, the CWM is prepared from a sheet of ICL comprising two layers. In an aspect, the CWM is prepared from a sheet of ICL comprising three layers. In an aspect, the CWM is prepared from a sheet of ICL comprising four layers. In an aspect, the CWM is prepared from a sheet of ICL comprising five layers. In an aspect, the one or more layers of ICL are crosslinked prior to micronization. In an aspect, the CWM comprises PURAPLY®, PURAPLY AM®, PURAPLY MZ®, or PURAPLY AM-XT®.

The present disclosure provides for, and includes, compositions mainly comprised of native porcine Type I collagen. In aspects, the composition comprises greater than 90% (w/w) native porcine Type I collagen. In aspects, the composition comprises greater than 95% (w/w) native porcine Type I collagen.

The present disclosure provides for, and includes, a composition having low levels of lipids. In aspects of the present disclosure, the composition comprises less than 1.0% lipids (w/w). In aspects of the present disclosure, the composition comprises less than 0.9% lipids (w/w). In aspects of the present disclosure, the composition comprises less than 0.8% lipids (w/w). In aspects of the present disclosure, the composition comprises less than 0.7% lipids (w/w). In aspects of the present disclosure, the composition comprises less than 0.6% lipids (w/w). In aspects of the present disclosure, the composition comprises less than 0.5% lipids (w/w). In aspects of the present disclosure, the composition comprises between 0.5% and 1.0% lipids (w/w). In aspects of the present disclosure, the composition comprises between 0.6% and 0.8% lipids (w/w). In aspects of the present disclosure, the composition comprises about 0.7% lipids (w/w).

The present disclosure provides for, and includes, a composition having low or undetectable levels of glycosaminoglycans. In aspects of the present disclosure, the composition comprises less than 1.0% glycosaminoglycans (w/w). In aspects of the present disclosure, the composition comprises less than 0.8% glycosaminoglycans (w/w). In aspects of the present disclosure, the composition comprises less than 0.6% glycosaminoglycans (w/w). In aspects of the present disclosure, the composition comprises less than 0.4% glycosaminoglycans (w/w). In aspects of the present disclosure, the composition comprises less than 0.2% glycosaminoglycans (w/w). In aspects of the present disclosure, the composition comprises about 1.0% glycosaminoglycans (w/w). In aspects of the present disclosure, the level of glycosaminoglycans in the composition is undetectable.

The present disclosure provides for, and includes, a composition having low or undetectable levels of DNA. In aspects of the present disclosure, the composition comprises less than 0.5 nanograms per milliliter (ng/ml) DNA. In aspects of the present disclosure, the composition comprises less than 0.25 nanograms per milliliter (ng/ml) DNA. In aspects of the present disclosure, the composition comprises less than 0.1 nanograms per milliliter (ng/ml) DNA. In aspects of the present disclosure, the composition comprises about 0.1 nanograms per milliliter (ng/ml) DNA. In aspects of the present disclosure, the level of DNA in the composition is undetectable.

The present disclosure also provides for, and includes, micronized particles of CWM further comprising an antimicrobial agent selected from the group consisting of benzalkonium chloride, cetrimide, chlorhexidine, polyhexanide biguanide (polyhexanide, polyhexamethylene biguanide, polyhexamethylene guanide, poly(iminoimidocarbonyl-iminoimidocarbonyliminohexamethylene), poly(hexamethylenebiguanide), polyaminopropyl biguanide) and salts or combinations thereof. In an aspect, the antimicrobial agent is a cationic antimicrobial that is a quaternary ammonium compound, bisbiguanide or polymeric biguanide. In an aspect, the antimicrobial agent is a polyhexamethylene biguanide (PHMB) coating. In aspects, the concentration of PHMB is less than 0.05% by weight (w/w). In aspects, the concentration of PHMB is between 0.001% and 0.045% (w/w). In aspects, the concentration of PHMB is between 0.01% and 0.02% (w/w).

In aspects according to the present disclosure, the antimicrobial agent is applied to the surface of a sheet of ICL. In aspects, the sheet of ICL comprises one or more layers, with or without an antimicrobial agent. As provided herein, the antimicrobial is applied to the surface of the ICL and allowed to dry prior to micronization.

The present disclosure provides for, and includes, compositions that are sterilized (e.g., pathogen inactivated). The sterilization process deactivates microorganisms within a composition. In aspects, a composition is sterilized by irradiation. In further aspects, the composition is sterilized by gamma irradiation. In other further aspects, a composition is sterilized by x-ray irradiation.

The present disclosure provides for, and includes, a composition comprising micronized particles of a CWM having a particle size between 10 to $1200 \times 10^{-6}$ meters (micrometers, microns, or μm) diameter, a porosity of between 55 to 95%, and a density of between 0.4 to 1.4 gram/milliliter (g/ml) and further comprising polyhexamethylene biguanide (PHMB) at a concentration between 0.001% and 0.045% (w/w). In certain aspects, the concentration of PHMB is between 0.01% and 0.02% (w/w). In aspects, the CWM comprises a porcine collagen. In further aspects, the CWM comprises porcine Type I collagen. In aspects, the CWM comprises native porcine Type I collagen.

The present disclosure provides for, and includes, a composition comprising micronized particles of a CWM having an average particle of 1000 micrometers (μm) or less in diameter, where the composition comprises greater than 95% (w/w) native porcine Type I collagen, less than 0.7% (w/w) lipids, less than 1.0% (w/w) glycosaminoglycans, and less than 0.1 nanograms per milliliter (ng/ml) DNA. In further aspects, the native porcine Type I collagen is free of cells and cell remnants.

The present disclosure also provides for, and includes, a gamma irradiated composition comprising micronized particles of a CWM having an average particle of 1000 micrometers (μm) or less in diameter, where the composition comprises greater than 95% (w/w) native porcine Type I collagen, less than 0.7% (w/w) lipids, less than 1.0% (w/w) glycosaminoglycans, and less than 0.1 nanograms per milliliter (ng/ml) DNA. In further aspects, the native porcine Type I collagen is free of cells and cell remnants.

Also included, and provided for, in the present disclosure are pastes comprising micronized particles of a CWM having a particle size between 10 to $1200 \times 10^{-6}$ meters (micrometers, microns, or μm) diameter, a porosity of between 55 to 95%, and a density of between 0.4 to 1.4 gram/milliliter (g/ml). In aspects, the pastes are aqueous pastes. In other aspects, the pastes are non-aqueous pastes.

In aspects, the pastes of the present disclosure are water-based pastes. As provided herein, the water-based pastes are isotonic pastes (e.g., about 0.15 M salt equivalent). In an aspect, the pastes are prepared using phosphate buffered saline (PBS) comprising 10 mM $PO_4^{3-}$, 137 mM NaCl, and 2.7 mM KCl. As provided herein, the pastes have a viscosity of at least 1.5 newton-second per square meter (N·s/m²) or pascal-second (P·s). In aspects, the viscosity is at least 10 P·s. In other aspects, the paste is between 10 and 1000 P·s.

As provided herein, the paste may be prepared from a dry powder of the CWM at the point of use.

In aspects, the pastes of the present disclosure are derived from blood. As provided herein, blood used to form a paste may be whole blood or platelet-rich plasma.

The present disclosure provides for, and includes, hemostatic pastes comprising micronized particles of a CWM having a particle size between 10 to $1200 \times 10^{-6}$ meters (micrometers, microns, or μm) diameter, a porosity of between 55 to 95%, and a density of between 0.4 to 1.4 gram/milliliter (g/ml) suspended in an isotonic saline solution. As provided herein, the hemostatic pastes of the present disclosure may be prepared from a dry powder of the CWM at the point of use.

Also included and provided for, are preparations that are bacterial endotoxin-free as determined using the methods of USP Bacterial Endotoxin Testing for Medical Devices. As provided herein, the micronized particles of a CWM having a particle size between 10 to $1200 \times 10^{-6}$ meters (micrometers, microns or μm) diameter, a porosity of between 55 to 95%, and a density of between 0.4 to 1.4 gram/milliliter (g/ml) have less than 25 endotoxin units (EU) per 100 milligrams of micronized particles. Also included, and provided for, are micronized particles of a CWM having fewer than 10 endotoxin units (EU) per 100 milligrams. In other aspects, the micronized particles of a CWM have fewer than 5 endotoxin units (EU) per 100 milligrams. In yet a further aspect, the micronized particles have undetectable levels of endotoxins per 100 milligrams.

The present disclosure provides for, and includes, a method for managing a wound in a subject in need thereof comprising cleaning the wound of debris and necrotic tissue and applying a micronized collagen composition comprising particles of CWM having a particle size between 10 to $1200 \times 10^{-6}$ meters (micrometers, microns, or μm) diameter, a porosity of between 55 to 95%, and a density of between 0.4 to 1.4 gram/milliliter (g/ml) to the entire area of the wound. In aspects, the method of managing a wound further included debriding the wound to ensure the wound edges contain viable tissue. In aspects, the CWM comprises a porcine collagen. In further aspects, the CWM comprises porcine Type I collagen. In aspects, the CWM comprises native porcine Type I collagen. In aspects, the CWM particles are flakes.

Also included, and provided for, in methods for managing a wound in a subject in need, is applying an appropriate, non-adherent, secondary dressing to maintain a moist wound environment according to methods known to persons of skill in the art. Optimum secondary dressings are determined by wound location, size, depth and user preference and in accordance with practices known to doctors and other skilled practitioners. Change the secondary dressing as needed to maintain a moist, clean wound area. Frequency of secondary dressing change will be dependent upon volume of exudate produced and type of dressing used.

In aspects of the present disclosure, as healing occurs, sections of the micronized collagen composition comprising particles of CWM may gradually flake and may be removed during dressing changes but are not forcibly removed. In aspects, the micronized CWM may form a gel that may be rinsed away with gentle irrigation and replaced by additional micronized CWM in accordance with the present disclosure to ensure continuous and complete coverage of the wound during healing. As provided herein, the method further includes evaluating the wound on at least a weekly basis and the micronized CWM re-applied to ensure complete coverage of the wound.

As provided herein, a subject in need thereof is either a human or animal having a wound. In aspects, the subject in need is a person.

In aspects, the methods for managing a wound in a subject in need comprise a subject having wounds selected from the group consisting of partial thickness wounds, full-thickness wounds, pressure ulcers, venous ulcers, diabetic ulcers, chronic vascular ulcers, tunneled wounds, undermined wounds, surgical wounds, trauma wounds, second degree burns, and draining wounds.

In aspects, the methods for managing a wound in a subject in need comprise a subject having surgical wounds selected from the group consisting of donor site wounds, graft wounds, post-Mohs' surgery wounds, post-laser surgery wounds, or podiatric wounds, or wound dehiscence. In other aspects, the wounds are selected from abrasions, lacerations, or skin tears.

In aspects, the methods for managing a wound in a subject in need comprise applying a cross-linked micronized collagen composition comprising particles of Collagen Wound Matrix (CWM) having a particle size between 10 to $1200 \times 10^{-6}$ meters (micrometers, microns, or μm) diameter, a porosity of between 55 to 95%, and a density of between 0.4 to 1.4 gram/milliliter (g/ml) to the entire area of the wound. In aspects, the CWM particles are flakes.

In aspects, the methods for managing a wound in a subject in need comprise applying a micronized collagen composition comprising particles of CWM having a particle size between 10 to $1200 \times 10^{-6}$ meters (micrometers, microns or μm) diameter, a porosity of between 55 to 95%, and a density of between 0.4 to 1.4 gram/milliliter (g/ml) to the entire area of the wound, wherein the particles of CWM further comprise and antimicrobial agent. In an aspect, the antimicrobial agent is a cationic antimicrobial. In another aspect, the antimicrobial is a quaternary ammonium compound, bisbiguanide or polymeric biguanide. In other aspects, the antimicrobial agent is a cationic antimicrobial agent selected from the group consisting of benzalkonium chloride, cetrimide, chlorhexidine, polyhexanide biguanide (polyhexanide, polyhexamethylene biguanide, polyhexamethylene guanide, poly(iminoimidocarbonyl-iminoimidocarbonyliminohexamethylene), poly(hexamethylenebiguanide), polyaminopropyl biguanide) and salts or combinations there-of. In certain aspects the CWM particles are prepared from cross-linked CWM.

In aspects, the methods for managing a wound in a subject in need comprise applying a micronized collagen composition comprising particles of CWM having a particle size between 10 to $1200 \times 10^{-6}$ meters (micrometers, microns, or μm) diameter, a porosity of between 55 to 95%, and a density of between 0.4 to 1.4 gram/milliliter (g/ml) to the entire area of the wound, wherein the particles of CWM further comprise polyhexamethylene biguanide (PHMB). In an aspect, the PHMB is present at a concentration of less than 0.05% by weight (w/w) of the dried particles. In another aspect, the method provides for PHMB that is present at a concentration between 0.001% and 0.045% (w/w). In a further aspect, the method provides for PHMB that is present at a concentration between 0.01% and 0.02% (w/w). The methods further provide for particles of Collagen Wound Matrix that have less than 25 endotoxin units (EU) per 100 milligrams of dry powder.

The present disclosure provides for, and includes, the use of a composition comprising a micronized collagen composition comprising particles of a CWM having a particle size between 10 to 1200 μm diameter, a porosity of between 55 to 95%, and a density of between 0.4 to 1.4 gram/milliliter (ml) for use in the manufacture of a medicament for the management of wounds selected from the group consisting of partial thickness wounds, full-thickness wounds, pressure ulcers, venous ulcers, diabetic ulcers, chronic vascular ulcers, tunneled wounds, undermined wounds, surgical wounds, wound dehiscence, trauma wounds, second degree burns, and draining wounds. In aspects, the surgical wounds are donor site wounds, graft wounds, post-Mohs' surgery wounds, post-laser surgery wounds, podiatric wounds, or wound dehiscence. In certain aspects, the trauma wounds are selected from abrasions, lacerations, or skin tears.

B. Definitions

The term "and/or" when used in a list of two or more items, means that any one of the listed items can be employed by itself or in combination with any one or more of the listed items. For example, the expression "A and/or B" is intended to mean either or both of A and B, i.e., A alone, B alone, or A and B in combination. The expression "A, B and/or C" is intended to mean A alone, B alone, C alone, A and B in combination, A and C in combination, B and C in combination, or A, B, and C in combination.

As used herein, terms in the singular and the singular forms "a," "an," and "the," for example, include plural referents unless the content clearly dictates otherwise.

Where a range of values is provided, it is understood that each intervening value, between the upper and lower limit of that range and any other stated or intervening value in that stated range is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure. Whenever the phrase "comprising" is used, variations such as "consisting essentially of" and "consisting of" are also contemplated.

Unless defined otherwise herein, terms are to be understood according to conventional usage by those of ordinary skill in the relevant art. Where a term is provided in the singular, the inventors also contemplate aspects of the disclosure described by the plural of that term. Where there are discrepancies in terms and definitions used in references that are incorporated by reference, the terms used in this application shall have the definitions given herein. Other technical terms used have their ordinary meaning in the art in which they are used, as exemplified by various art-specific dictionaries, for example, "The American Heritage® Science Dictionary" (Editors of the American Heritage Dictionaries, 2011, Houghton Mifflin Harcourt, Boston and New York), or the "McGraw-Hill Dictionary of Scientific and Technical Terms" (6th edition, 2002, McGraw-Hill, New York).

As used herein, the term "matrix" refers to the material or tissue between a eukaryotic organism's cells, and the term "extracellular matrix" or "ECM" refers to the structure of extracellular macromolecules and minerals that provide structural and biochemical support between and around cells and serves as the scaffolding for tissues and organs throughout the body. The main components of the extracellular matrix are collagen fibers, which organize and strengthen the matrix, and elastin fibers, which provide elasticity and resilience to the matrix. The extracellular matrix comprises interstitial matrix (i.e., matrix present in intracellular spaces) and basement membrane (i.e., sheet-like depositions on which various epithelial cells rest). The extracellular matrix serves a range of functions, such as providing physical support, segregating tissue types, regulating intracellular communication, and regulating dynamic behavior of cells. The extracellular matrix is also able to sequester or store cellular growth factors which, upon release, enables rapid and local growth factor-mediated activation of cellular function. Formation of extracellular matrix is essential for processes like growth, wound healing, and fibrosis, and extracellular matrix has been found to cause regrowth and healing of injured tissue by (1) preventing the immune system from responding to the injury with inflammation and scar tissue, and (2) facilitating repair of damaged tissue rather than scar tissue formation by surrounding cells at the site of injury.

As used herein, the term "wound matrix" refers to extracellular matrix that is applied to a wound or site of injury. As used herein, the term "Collagen Wound Matrix," or "CWM," refers to a wound matrix comprising collagen as its main component.

As used herein, "wound management" refers to the passive support of a patient's healing ability by providing an appropriate environment for a wound to heal.

As used herein, "micronization" refers to reducing the average size of a solid material's particles into very fine particles. Processes for micronization include milling, grinding, bashing, and crushing.

As used herein, the term "salt" refers to the combination of a compound and a counterion to form a neutral complex. For reviews on suitable salts, and pharmaceutically acceptable salts amenable for use herein, see Berge et al., "Pharmaceutical salts," *J. Pharm. Sci.* 66(1):1-19 (1997); and "Handbook of Pharmaceutical Salts: Properties, selection and use", P. H. Stahl, P. G. Vermuth, IUPAC, Wiley-VCH (2002), each of which is incorporated by reference herein in their entireties for all purposes.

As used herein, the term "porosity" refers to the amount of void ("empty") space within a material or composition. Porosity can be expressed as a fraction of void volume over total volume, or as a percentage. Porosity can be measured by a variety of techniques, including nitrogen adsorption, thermoporometry, scanning electron microscopy (SEM), atomic force microscopy, confocal laser scanning microscopy, nuclear magnetic resonance (NMR), X-ray computed tomography (CT), and terahertz time-domain spectroscopy (THz-TDS).

As used herein, the "density" of a substance is its mass per unit volume. Density is calculated by $d=M/V$, where d is the density, M is the mass, and V is the volume.

As used herein, a "hemostatic dressing" is a substance for application to a wound which promotes hemostasis and shortens the clotting time of blood. Types of hemostatic dressings include bandages, dry powders, and pastes.

Having now generally described the disclosure, the same will be more readily understood through reference to the following examples that are provided by way of illustration, and are not intended to be limiting of the present disclosure, unless specified.

Each periodical, patent, and other document or reference cited herein is herein incorporated by reference in its entirety.

C. Embodiments

Embodiment 1. A micronized collagen composition comprising particles of a Collagen Wound Matrix (CWM) having a particle size range of between 10 to 1200 micrometers (μm) in diameter, a porosity of between 55 to 95%, and a density of between 0.4 to 1.4 gram/milliliter (g/ml).

Embodiment 2. The composition of Embodiment 1, wherein the CWM comprises porcine Type I collagen.

Embodiment 3. The composition of Embodiment 2, wherein the CWM comprises native porcine Type I collagen.

Embodiment 4. The composition of Embodiment 3, wherein the native porcine Type I collagen is free of cells and cell remnants.

Embodiment 5. The composition of Embodiment 3 or Embodiment 4, wherein the CWM comprising native porcine Type I collagen has a denaturation temperature determined by differential scanning calorimetry (DSC) of ≥45° C.

Embodiment 6. The composition of any one of Embodiments 3 to 5, wherein the composition comprises greater than 95% (w/w) native porcine Type I collagen.

Embodiment 7. The composition of any one of Embodiments 1 to 6, wherein the CWM is cross-linked.

Embodiment 8. The composition of any one of Embodiments 1 to 7, wherein the particles are flakes.

Embodiment 9. The composition of any one of Embodiments 1 to 8, wherein the composition is gamma irradiated.

Embodiment 10. The composition of any one of Embodiments 1 to 9, wherein the composition comprises less than 0.7% (w/w) lipids.

Embodiment 11. The composition of any one of Embodiments 1 to 10, wherein the composition comprises less than 1.0% (w/w) glycosaminoglycans.

Embodiment 12. The composition of any one of Embodiments 1 to 11, wherein the composition comprises less than 0.1 nanograms per microliter (ng/μL) DNA.

Embodiment 13. The composition of any one of Embodiments 1 to 12, wherein the composition further comprises an antimicrobial agent.

Embodiment 14. The composition of Embodiment 13, wherein the antimicrobial agent is a cationic antimicrobial selected from the group consisting of a quaternary ammonium compound, bisbiguanide, and polymeric biguanide.

Embodiment 15. The composition of Embodiment 14, wherein the cationic antimicrobial agent is selected from the group consisting of benzalkonium chloride, cetrimide, chlorhexidine, polyhexanide biguanide (polyhexanide, polyhexamethylene biguanide, polyhexamethylene guanide, poly(iminoimidocarbonyl-iminoimidocarbonyliminohexamethylene), poly(hexamethylenebiguanide), polyaminopropyl biguanide), and salts or combinations thereof.

Embodiment 16. The composition of any one of Embodiments 1 to 15, wherein the particles further comprises a polyaminopropyl biguanide coating.

Embodiment 17. The composition of Embodiment 16, wherein the polyaminopropyl biguanide coating comprises polyhexamethylene biguanide (PHMB).

Embodiment 18. The composition of Embodiment 17, wherein the PHMB is added prior to micronization.

Embodiment 19. The composition of Embodiment 17 or Embodiment 18, wherein the PHMB is present at a concentration of less than 0.05% by weight (w/w) of the dried particles.

Embodiment 20. The composition of Embodiment 19, wherein the PHMB is present at a concentration between 0.001% and 0.045% (w/w).

Embodiment 21. The composition of Embodiment 20, wherein the PHMB is present at a concentration between 0.01% and 0.02% (w/w).

Embodiment 22. The composition of any one of Embodiments 1 to 21, wherein less than 0.5% of the particles are greater than 1000 μm in diameter.

Embodiment 23. The composition of any one of Embodiments 1 to 22, wherein the particles are wet particles, and wherein the composition further comprises a sterile solution.

Embodiment 24. The composition of Embodiment 23, wherein the sterile solution is sterile saline solution.

Embodiment 25. The composition of Embodiment 23 or Embodiment 24, wherein the wet particles are prepared as a hemostatic paste.

Embodiment 26. The composition of any one of Embodiments 1 to 25, wherein the composition comprises less than 25 endotoxin units (EU) per 100 milligrams (mg).

Embodiment 27. The composition of any one of Embodiments 1 to 27, wherein the composition further comprises petrolatum or an oil-based carrier.

Embodiment 28. A micronized collagen composition comprising particles of a Collagen Wound Matrix (CWM) having an average particle size of 1000 micrometers (μm) or less in diameter, wherein the composition comprises porcine collagen.

Embodiment 29. The composition of Embodiment 28, wherein the composition comprises greater than 95% (w/w) porcine collagen.

Embodiment 30. The composition of Embodiment 28 or Embodiment 29, wherein the CWM comprises porcine Type I collagen.

Embodiment 31. The composition of Embodiment 30, wherein the CWM comprises native porcine Type I collagen.

Embodiment 32. The composition of Embodiment 31, wherein the native porcine Type I collagen is free of cells and cell remnants.

Embodiment 33. The composition of Embodiment 31 or Embodiment 32, wherein the CWM comprising native porcine Type I collagen has a denaturation temperature determined by differential scanning calorimetry (DSC) of ≥45° C.

Embodiment 34. The composition of any one of Embodiments 28 to 33, wherein the composition comprises less than 0.7% (w/w) lipids.

Embodiment 35. The composition of any one of Embodiments 28 to 34, wherein the composition comprises less than 1.0% (w/w) glycosaminoglycans.

Embodiment 36. The composition of any one of Embodiments 28 to 35, wherein the composition comprises less than 0.1 nanograms per milliliter (ng/ml) DNA.

Embodiment 37. The composition of any one of Embodiments 28 to 36, wherein the composition is gamma irradiated.

Embodiment 38. The composition of any one of Embodiments 28 to 37, wherein the CWM is cross-linked.

Embodiment 39. The composition of any one of Embodiments 28 to 38, wherein the particles are flakes.

Embodiment 40. The composition of any one of Embodiments 28 to 39, wherein the composition further comprises an antimicrobial agent.

Embodiment 41. The composition of Embodiment 40, wherein the antimicrobial agent is a cationic antimicrobial selected from the group consisting of a quaternary ammonium compound, bisbiguanide, and polymeric biguanide.

Embodiment 42. The composition of Embodiment 41, wherein the cationic antimicrobial agent is selected from the group consisting of benzalkonium chloride, cetrimide, chlorhexidine, polyhexanide biguanide (polyhexanide, polyhexamethylene biguanide, polyhexamethylene guanide, poly(iminoimidocarbonyl-iminoimidocarbonyliminohexamethylene), poly(hexamethylenebiguanide), polyaminopropyl biguanide), and salts or combinations thereof.

Embodiment 43. The composition of any one of Embodiments 28 to 42, wherein the particles further comprises a polyaminopropyl biguanide coating.

Embodiment 44. The composition of Embodiment 43, wherein the polyaminopropyl biguanide coating comprises polyhexamethylene biguanide (PHMB).

Embodiment 45. The composition of Embodiment 44, wherein the PHMB is added prior to micronization.

Embodiment 46. The composition of Embodiment 44 or Embodiment 45, wherein the PHMB is present at a concentration of less than 0.05% by weight (w/w) of the dried particles.

Embodiment 47. The composition of Embodiment 46, wherein the PHMB is present at a concentration between 0.001% and 0.045% (w/w).

Embodiment 48. The composition of Embodiment 47, wherein the PHMB is present at a concentration between 0.01% and 0.02% (w/w).

Embodiment 49. The composition of any one of Embodiments 28 to 48, wherein the particles are wet particles, and wherein the composition further comprises a sterile solution.

Embodiment 50. The composition of Embodiment 49, wherein the sterile solution is sterile saline solution.

Embodiment 51. The composition of Embodiment 49 or Embodiment 50, wherein the wet particles are prepared as a hemostatic paste.

Embodiment 52. The composition of any one of Embodiments 28 to 51, wherein the composition comprises less than 25 endotoxin units (EU) per 100 milligrams (mg).

Embodiment 53. The composition of any one of Embodiments 28 to 52, wherein the composition further comprises petrolatum or an oil-based carrier.

Embodiment 54. A method for managing a wound in a subject in need thereof comprising cleaning the wound of debris and necrotic tissue; and applying a micronized collagen composition comprising particles of a Collagen Wound Matrix (CWM) having a particle size range of between 10 to 1200 micrometers (μm) in diameter, a porosity of between 55 to 95%, and a density of between 0.4 to 1.4 gram/milliliter (g/ml) to the entire area of the wound.

Embodiment 55. The method of Embodiment 54, further comprising debriding the wound to ensure the edges of the wound contain viable tissue.

Embodiment 56. The method of Embodiment 54 or Embodiment 55, further comprising hydrating the composition with sterile saline solution or a biological fluid selected from amniotic suspension, blood, bone marrow aspirate, or platelet rich plasma, to form a paste.

Embodiment 57. The method of any one of Embodiments 54 to 56, further comprising applying one or more secondary dressings to the wound as appropriate for the type and stage of the wound.

Embodiment 58. The method of any one of Embodiments 54 to 57, wherein the micronized collagen composition is applied to the wound weekly until the wound has healed.

Embodiment 59. The method of any one of Embodiments 54 to 58, wherein the wound is selected from the group consisting of partial thickness wounds, full-thickness wounds, pressure ulcers, venous ulcers, diabetic ulcers, chronic vascular ulcers, tunneled wounds, undermined wounds, surgical wounds, wound dehiscence, trauma wounds, second degree burns, and draining wounds.

Embodiment 60. The method of Embodiment 59, wherein the surgical wounds are donor site wounds, graft wounds, post-Mohs' surgery wounds, post-laser surgery wounds, podiatric wounds, or wound dehiscence.

Embodiment 61. The method of Embodiment 59, the trauma wounds are selected from abrasions, lacerations, or skin tears.

Embodiment 63. The method of any one of Embodiments 54 to 61, wherein the CWM comprises porcine Type I collagen.

Embodiment 64. The method of Embodiment 63, wherein the CWM comprises native porcine Type I collagen.

Embodiment 65. The method of Embodiment 64, wherein the CWM comprising native porcine Type I collagen has a denaturation temperature determined by differential scanning calorimetry (DSC) of ≥45° C.

Embodiment 66. The method of any one of Embodiments 63 to 65, wherein the composition comprises greater than 95% native porcine Type I collagen.

Embodiment 67. The method of any one of Embodiments 54 to 66, wherein the CWM is cross-linked.

Embodiment 68. The method of any one of Embodiments 54 to 67, wherein the CWM particles are flakes.

Embodiment 69. The method of any one of Embodiments 54 to 68, wherein the composition has undergone gamma irradiation.

Embodiment 70. The method of any one of Embodiments 54 to 69, wherein the composition comprises less than 0.7% lipids.

Embodiment 71. The method of any one of Embodiments 54 to 70, wherein the composition comprises less than 1.0% glycosaminoglycans.

Embodiment 72. The method of any one of Embodiments 54 to 71, wherein the composition comprises less than 0.1 nanograms per microliter (ng/μL) DNA.

Embodiment 73. The method of any one of Embodiments 54 to 72, wherein the composition further comprises an antimicrobial agent.

Embodiment 74. The method of Embodiment 73, wherein the antimicrobial agent is a cationic antimicrobial selected from the group consisting of a quaternary ammonium compound, bisbiguanide, or polymeric biguanide.

Embodiment 75. The method of Embodiment 74, wherein the cationic antimicrobial agent is selected from the group consisting of benzalkonium chloride, cetrimide, chlorhexidine, polyhexanide biguanide (polyhexanide, polyhexamethylene biguanide, polyhexamethylene guanide, poly(iminoimidocarbonyl-iminoimidocarbonyliminohexamethylene), poly(hexamethylenebiguanide), polyaminopropyl biguanide), and salts or combinations thereof.

Embodiment 76. The method of any one of Embodiments 54 to 75, wherein the particles further comprise a polyaminopropyl biguanide coating.

Embodiment 77. The method of Embodiment 76, wherein the polyaminopropyl biguanide coating comprises polyhexamethylene biguanide (PHMB).

Embodiment 78. The method of Embodiment 76 or Embodiment 77, wherein the PHMB is present at a concentration of less than 0.05% by weight (w/w) of the dried particles.

Embodiment 79. The method of Embodiment 78, wherein the PHMB is present at a concentration between 0.001% and 0.045% (w/w).

Embodiment 80. The method of Embodiment 79, wherein the PHMB is present at a concentration between 0.01% and 0.02% (w/w).

Embodiment 81. The method of any one of Embodiments 54 to 80, wherein less than 0.5% of the particles are greater than 1000 μm in diameter.

Embodiment 82. The method of any one of Embodiments 54 to 81, wherein the composition comprises less than 25 endotoxin units (EU) per 100 milligrams (mg).

Embodiment 83. A method for managing a wound in a subject in need thereof comprising cleaning the wound of debris and necrotic tissue; and applying a micronized collagen composition to the entire area of the wound, wherein the composition comprises particles of a Collagen Wound Matrix (CWM) having an average particle size of 1000 micrometers (μm) or less in diameter, and wherein the composition comprises greater than 95% (w/w) porcine collagen.

Embodiment 84. The method of Embodiment 83, further comprising debriding the wound to ensure the edges of the wound contain viable tissue.

Embodiment 85. The method of Embodiment 83 or Embodiment 84, further comprising hydrating the composition with sterile saline solution or a biological fluid selected from amniotic suspension, blood, bone marrow aspirate, or platelet rich plasma, to form a paste.

Embodiment 86. The method of any one of Embodiments 83 to 85, further comprising applying one or more secondary dressings to the wound as appropriate for the type and stage of the wound.

Embodiment 87. The method of any one of Embodiments 83 to 86, wherein the micronized collagen composition is applied to the wound weekly until the wound has healed.

Embodiment 88. The method of any one of Embodiments 83 to 87, wherein the wound is selected from the group consisting of partial thickness wounds, full-thickness wounds, pressure ulcers, venous ulcers, diabetic ulcers, chronic vascular ulcers, tunneled wounds, undermined wounds, surgical wounds, wound dehiscence, trauma wounds, second degree burns, and draining wounds.

Embodiment 89. The method of Embodiment 88, wherein the surgical wounds are donor site wounds, graft wounds, post-Mohs' surgery wounds, post-laser surgery wounds, podiatric wounds, or wound dehiscence.

Embodiment 90. The method of Embodiment 88, the trauma wounds are selected from abrasions, lacerations, or skin tears.

Embodiment 91. The method of any one of Embodiments 83 to 89, wherein the CWM comprises porcine Type I collagen.

Embodiment 92. The method of Embodiment 91, wherein the CWM comprises native porcine Type I collagen.

Embodiment 93. The method of Embodiment 92, wherein the native porcine Type I collagen is free of cells and cell remnants.

Embodiment 94. The method of Embodiment 92 or Embodiment 93, wherein the CWM comprising native porcine Type I collagen has a denaturation temperature determined by differential scanning calorimetry (DSC) of ≥45° C.

Embodiment 95. The method of any one of Embodiments 92 to 94, wherein the composition comprises greater than 95% native porcine Type I collagen.

Embodiment 96. The method of any one of Embodiments 83 to 95, wherein the CWM is cross-linked.

Embodiment 97. The method of any one of Embodiments 83 to 96, wherein the CWM particles are flakes.

Embodiment 98. The method of any one of Embodiments 83 to 97, wherein the composition has undergone gamma irradiation.

Embodiment 99. The method of any one of Embodiments 83 to 98, wherein the composition comprises less than 0.7% lipids.

Embodiment 100. The method of any one of Embodiments 83 to 99, wherein the composition comprises less than 1.0% glycosaminoglycans.

Embodiment 101. The method of any one of Embodiments 83 to 100, wherein the composition comprises less than 0.1 nanograms per microliter (ng/μL) DNA.

Embodiment 102. The method of any one of Embodiments 93 to 101, wherein the composition further comprises an antimicrobial agent.

Embodiment 103. The method of Embodiment 102, wherein the antimicrobial agent is a cationic antimicrobial selected from the group consisting of a quaternary ammonium compound, bisbiguanide, or polymeric biguanide.

Embodiment 104. The method of Embodiment 103, wherein the cationic antimicrobial agent is selected from the group consisting of benzalkonium chloride, cetrimide, chlorhexidine, polyhexanide biguanide (polyhexanide, polyhexamethylene biguanide, polyhexamethylene guanide, poly(iminoimidocarbonyl-iminoimidocarbonyliminohexamethylene), poly(hexamethylenebiguanide), polyaminopropyl biguanide), and salts or combinations thereof.

Embodiment 105. The method of any one of Embodiments 83 to 104, wherein the particles further comprise a polyaminopropyl biguanide coating.

Embodiment 106. The method of Embodiment 105, wherein the polyaminopropyl biguanide coating comprises polyhexamethylene biguanide (PHMB).

Embodiment 107. The method of Embodiment 106, wherein the PHMB is present at a concentration of less than 0.05% by weight (w/w) of the dried particles.

Embodiment 108. The method of Embodiment 107, wherein the PHMB is present at a concentration between 0.001% and 0.045% (w/w).

Embodiment 109. The method of Embodiment 108, wherein the PHMB is present at a concentration between 0.01% and 0.02% (w/w).

Embodiment 110. The method of any one of Embodiments 83 to 109, wherein the composition comprises less than 25 endotoxin units (EU) per 100 milligrams (mg).

Embodiment 111. A micronized collagen composition comprising particles of a Collagen Wound Matrix (CWM) having a particle size between 10 to 1200 micrometers (μm) in diameter, a porosity of between 55 to 95%, and a density of between 0.4 to 1.4 gram/milliliter (g/ml) for use in the manufacture of a medicament for the management of wounds selected from the group consisting of partial thickness wounds, full-thickness wounds, pressure ulcers, venous ulcers, diabetic ulcers, chronic vascular ulcers, tunneled wounds, undermined wounds, surgical wounds, wound dehiscence, trauma wounds, second degree burns, and draining wounds.

Embodiment 112. The composition for use according to Embodiment 111, wherein the surgical wounds are donor site wounds, graft wounds, post-Mohs' surgery wounds, post-laser surgery wounds, podiatric wounds, or wound dehiscence.

Embodiment 113. The composition for use according to Embodiment 111, wherein the trauma wounds are selected from abrasions, lacerations, or skin tears.

Embodiment 114. A micronized collagen composition comprising particles of a Collagen Wound Matrix (CWM) having an average particle size of 1000 micrometers (μm) or less in diameter for use in the manufacture of a medicament for the management of wounds selected from the group consisting of partial thickness wounds, full-thickness wounds, pressure ulcers, venous ulcers, diabetic ulcers, chronic vascular ulcers, tunneled wounds, undermined wounds, surgical wounds, wound dehiscence, trauma wounds, second degree burns, and draining wounds, wherein the composition comprises greater than 95% (w/w) native porcine Type I collagen, less than 0.7% (w/w) lipids, less than 1.0% (w/w) glycosaminoglycans, and less than 0.1 nanograms per milliliter (ng/ml) DNA.

Embodiment 115. The composition for use according to Embodiment 114, wherein the native porcine Type I collagen is free of cells and cell remnants.

Embodiment 116. The composition for use according to Embodiment 114 or Embodiment 115, wherein the surgical wounds are donor site wounds, graft wounds, post-Mohs' surgery wounds, post-laser surgery wounds, podiatric wounds, or wound dehiscence.

Embodiment 117. The composition for use according to Embodiment 114 or Embodiment 115, wherein the trauma wounds are selected from abrasions, lacerations, or skin tears.

Embodiment 118. A method of producing a micronized collagen composition comprising particles of a Collagen Wound Matrix (CWM) comprising generating intestinal collagen layers (ICLs) from the small intestine of a pig; chemically cleaning the ICLs to produce chemically-cleaned ICLs; drying the chemically-cleaned ICLs to produce dried, chemically-cleaned ICLs; and milling the dried, chemically-cleaned ICLs to produce a micronized collagen composition comprising particles of a Collagen Wound Matrix (CWM) having a particle size range of between 10 to 1200 microns (μm) in diameter, a porosity of between 55 to 95%, and a density of between 0.4 to 1.4 gram/milliliter (g/ml).

Embodiment 119. The method of Embodiment 118, further comprising irradiating the composition with gamma rays.

Embodiment 120. The method of Embodiment 118 or Embodiment 119, wherein the generating ICLs comprises trimming the small intestine into intestinal sheets; and mechanically removing inner and outer mucosal layers from the intestinal sheets to form the intestinal collagen layers (ICLs).

Embodiment 121. The method of any one of Embodiments 118 to 120, wherein the chemically cleaning comprises incubating the intestinal collagen layers (ICLs) at a pH of 11 to 12, followed by incubating at a pH of 0 to 1, followed by incubating at a pH of 7 to 7.4 in phosphate buffered saline (PBS).

Embodiment 122. The method of any one of Embodiments 118 to 121, further comprising packaging the composition into one or more single-use packages.

Embodiment 123. The method of Embodiment 122, wherein each of the one or more single-use packages contains 100 milligrams (mg), 500 mg, or 1000 mg of the composition.

Embodiment 124. The method of Embodiment 122 or Embodiment 123, further comprising storing the one or more single-use packages for up to 8 months prior to use.

Embodiment 125. A method of producing a micronized collagen composition comprising particles of a Collagen Wound Matrix (CWM) comprising generating intestinal collagen layers (ICLs) from the small intestine of a pig; chemically cleaning the ICLs to produce chemically-cleaned ICLs; drying the chemically-cleaned ICLs to produce dried, chemically-cleaned ICLs; and milling the dried, chemically-cleaned ICLs to produce a micronized collagen composition comprising particles of a Collagen Wound Matrix (CWM) having an average particle size of 1000 micrometers (μm) or less in diameter, wherein the composition comprises greater than 95% (w/w) porcine collagen, less than 0.7% (w/w) lipids, less than 1.0% (w/w) glycosaminoglycans, and less than 0.1 nanograms per milliliter (ng/ml) DNA.

Embodiment 126. The method of Embodiment 125, wherein the porcine collagen is native porcine Type I collagen free of cells and cell remnants.

Embodiment 127. The method of Embodiment 125 or Embodiment 126, further comprising irradiating the composition with gamma rays.

Embodiment 128. The method of any one of Embodiments 125 to 127, wherein the generating ICLs comprises trimming the small intestine into intestinal sheets; and mechanically removing inner and outer mucosal layers from the intestinal sheets to form the intestinal collagen layers (ICLs).

Embodiment 129. The method of any one of Embodiments 125 to 128, wherein the chemically cleaning comprises incubating the intestinal collagen layers (ICLs) at a pH of 11 to 12, followed by incubating at a pH of 0 to 1, followed by incubating at a pH of 7 to 7.4 in phosphate buffered saline (PBS).

Embodiment 130. The method of any one of Embodiments 125 to 129, further comprising packaging the composition into one or more single-use packages.

Embodiment 131. The method of Embodiment 130, wherein each of the one or more single-use packages contains 100 milligrams (mg), 500 mg, or 1000 mg of the composition.

Embodiment 132. The method of Embodiment 130 or Embodiment 131, further comprising storing the one or more single-use packages for up to 8 months prior to use.

Embodiment 133. A micronized collagen composition comprising particles of a Collagen Wound Matrix (CWM) having an average particle size of 1000 micrometers (μm) or less in diameter, wherein the composition comprises greater than 95% (w/w) native porcine Type I collagen, less than 0.7% (w/w) lipids, less than 1.0% (w/w) glycosaminoglycans, and less than 0.1 nanograms per milliliter (ng/ml) DNA, and wherein the native porcine Type I collagen is free of cells and cell remnants.

Embodiment 134. The composition of Embodiment 133, wherein the composition is gamma irradiated.

Embodiment 135. A micronized collagen composition comprising particles of a Collagen Wound Matrix (CWM) having an average particle size of 1000 micrometers (μm) or less in diameter, wherein the composition comprises greater than 95% (w/w) native porcine Type I collagen, less than 0.7% (w/w) lipids, less than 1.0% (w/w) glycosaminoglycans, and less than 0.1 nanograms per milliliter (ng/ml) DNA, wherein the native porcine Type I collagen is free of cells and cell remnants, and wherein the particles further comprise a polyaminopropyl biguanide coating comprising polyhexamethylene biguanide (PHMB).

Embodiment 136. The composition of Embodiment 135, wherein the composition is gamma irradiated.

Embodiment 137. A micronized collagen composition comprising particles of a Collagen Wound Matrix (CWM) having an average particle size of 1000 micrometers (μm) or less in diameter for use in the manufacture of a medicament for the management of wounds selected from the group consisting of partial thickness wounds, full-thickness wounds, pressure ulcers, venous ulcers, diabetic ulcers, chronic vascular ulcers, tunneled wounds, undermined wounds, surgical wounds, wound dehiscence, trauma wounds, second degree burns, and draining wounds, wherein the composition comprises greater than 95% (w/w) native porcine Type I collagen, less than 0.7% (w/w) lipids, less than 1.0% (w/w) glycosaminoglycans, and less than 0.1 nanograms per milliliter (ng/ml) DNA, wherein the native porcine Type I collagen is free of cells and cell remnants, and wherein the particles further comprise a polyaminopropyl biguanide coating comprising polyhexamethylene biguanide (PHMB).

Embodiment 138. The composition for use of Embodiment 137, wherein the composition is gamma irradiated.

EXAMPLES

Example 1: Preparation of Intestinal Collagen Layers (ICLs)

Porcine intestinal collagen is prepared essentially as described in U.S. Pat. No. 5,993,844. In brief, the small intestine of a pig is harvested, trimmed into a sheet and mechanically stripped and cleaned so that the tunica submucosa is delaminated and separated by mechanically squeezing the raw material between opposing rollers and washed using water. The tunica submucosa of the small intestine is comparatively harder and stiffer than the surrounding tissue, and the rollers squeeze the softer components from the submucosa. The intestine is cut lengthwise down the lumen and then cut into 15 cm sections. Material is weighed and placed into containers at a ratio of about 100:1 v/v of solution to intestinal material.

The resulting intestinal material is then treated with 1 liter of filter sterilized 100 mM ethylenediaminetetraacetic tetrasodium salt (EDTA)/10 mM sodium hydroxide (NaOH) solution at a maximum of 1.5 μm intestine/1 L ratio and placed on a shaker table for about 18 hours at about 200 rpm. After shaking, the EDTA/NaOH solution is removed from each container. To each container, approximately 1 liter of filter sterilized 1 M hydrochloric acid (HCl)/1 M sodium chloride (NaCl) solution is added and then placed on a shaker table for between about 6 to 8 hours at about 200 rpm. After shaking, the HCl/NaCl solution is removed from each container and replaced with approximately 1 liter of a solution of 0.22 mm filter sterilized 1 M sodium chloride (NaCl)/10 mM phosphate buffered saline (PBS). The containers are placed on a shaker table for approximately 18 hours at 200 rpm. After shaking, the NaCl/PBS solution is removed from each container and replaced with approximately 1 liter of filter sterilized 10 mM PBS. Containers are then placed on a shaker table for about two hours at 200 at rpm. After shaking, the phosphate buffered saline is removed from each container and replaced with approximately 1 liter of 0.22 mm filter sterilized water. Containers are placed on a shaker table for about one hour at 200 rpm. After shaking, the water is then removed from each container and the resulting Intestinal Collagen Layers (ICLs) allowed to dry. Treated samples are free of cells and cellular debris. The ICLs can be used fresh, or frozen for later use.

Example 2: Chemical Cleaning of Intestinal Collagen Layers (ICLs)

The ICLs prepared as described in Example 1 are chemically cleaned by treatment with alkali, chelating agents, acids and salts to remove non-collagenous components from the tissue matrix while controlling the amount of swelling and dissolution so that the resultant collagen matrix retains its structural organization, integrity and bioremodelable properties, as described in U.S. Pat. No. 6,893,653. In brief, ICLs are used fresh or thawed at a temperature below 55° C., cut lengthwise, and placed in purified water USP. All solutions are filter sterilized prior to use (0.2 μm filter).

Cut ICLs are placed in cleaning solution (100 mM EDTA/10 mM NaOH) for 16 to 20 hours. Cleaned ICLs are transferred to a second cleaning solution (1 M HCl/1 M NaCl) and agitated for 6 to 8 hours then rinsed in 1 M NaCl/1×PBS and agitated for 16 to 20 hours. A second rinse in 1×PBS is performed with agitation for 2 to 8 hours followed by a final rinse in purified water for 2 to 8 hours with agitation. Washed and treated samples comprise 0.016 μg/mg DNA or less. The mechanically and chemically cleaned ICLs can be used fresh, or frozen for later use.

Example 3: Effect of Humidity on Milling

The effect of storage humidity on milling of a porcine Collagen Wound Matrix (CWM) is determined by storing an unground CWM intermediate under the humidity condition per experimental group as shown in Table 1 for at least two hours prior to milling. Desiccated samples are placed in a desiccant chamber with fresh desiccants and sealed. High humidity samples are placed in an incubator set to the desired percent humidity and room temperature. The samples are milled for 5 minutes at 25 Hz and sieved with a <1000 μm into a 15 mL conical tube. The samples are observed for changes in appearance.

TABLE 1

Effect of Humidity on Milling

| Humidity Stored Prior to Milling | Observations |
| --- | --- |
| 95% Humidity | Yellowed powder that was stuck to the canister and very clumped |
| 80% Humidity | Slightly yellow powder that had some larger pieces not sieved |
| 75% Humidity | Slightly yellowed powder with minimal clumps |
| 70% Humidity | White powder that had some larger pieces not sieved |
| 65% Humidity | White powder with minimal clumps that looks similar to room temperature powder. |
| Room Temp (30.0% Humidity) | White powder that was very similar to desiccated sample |
| Desiccated | White powder that is not sticky or clumped |

The results show that humidities above 65% reduce the millability of a CWM, affect the color, and lead to clumping of the material and loss during sieving.

Example 4: Effect of ICL Shape on Drying and Milling of ICL

The effect of drying intestinal collagen layers (ICLs) on particle size, static charge, and reproducibility is investigated. Layered ICLs are prepared as described in Example 1. Three different forms of ICLs are evaluated and compared to layered, cross-linked ICLs containing PHMB (e.g., PuraPly® AM) as follows: 1. Control layered, cut, ICL; 2. Layered ICL, folded, but uncut; 3. Elongated ICLs (unlayered, noodle shaped); and 4. Shaped ICLs (formed in milling cup, nuggets). Elongated ICLs are prepared by stretching the ICLs out onto the drying trays but not spreading them. ICLs in the shape of the milling cup (nuggets) are created by placing the ICLs in the milling cup and transferring onto drying tray without altering the shape. After shaping, the ICLs are dried for 24 hours in a drying cabinet with air flow. Dried ICLs are removed and stored prior to milling.

Dried ICLs are milled using a Reich Ball Mill MM400 for 5 minutes at 25 Hz at room temperature. Control ICLs are cut into pieces no bigger than the milling cups and packed about one third full into the milling cup or about 1 gram of material. Folded ICLs are not cut, but folded to fit into a milling cup. One ICL fits into a single milling cup. Noodles are cut into approximately 2 cm long pieces with scissors and placed into the milling cup, about 0.5 to 2 noodles per cup. Individual nuggets are placed in a single milling cup. All samples are passed through a stainless steel sieve that has a pore size of less than 1000 um to remove larger particles and collect particles of less than 1000 µm after milling. Samples are then filled into vials.

Control ICLs produce powder as expected yielding 1329.68 mg of powder, however, the resulting powder is subject to high static charges making it difficult to work with.

Folded ICLs do not mill correctly, leaving behind a significant amount of material not able to pass through the sieve. Noodles mill well and produce an off-white powder that passes through the sieve. The powder appears fluffier than the control powder. Two noodles milled in 1 milling cup produce 1262.45 mg of powder and one noodle milled in 1 cup produces 737.57 mg of powder. One out of four of the nuggets does not mill properly and produces a grey powder with a significant amount of material left that does not pass through the sieve. The remaining three nuggets mill well and produce an off-white powder.

The dried ICL noodles produce a satisfactory powder and reduce the labor and increase the efficiency of the micronization process. Dried ICL nuggets do not consistently produce acceptable powder and are less ideal compared to dried ICL noodles for the production of micronized ICLs.

Example 5: Effect of Sample Packing

The packing of CWM into a canister affects the yield of micronized powder. The effect of canister packing is evaluated under three conditions as shown in Table 2.

TABLE 2

Canister Packing Conditions

| Condition | Weight A | Weight B |
| --- | --- | --- |
| Super Packed | 2.6956 g | 2.5037 g |
| Moderately Packed | 1.0753 g | 1.0873 g |
| Lightly Packed | 0.7731 g | 0.7250 g |

The dried ICL strips are cut to approximately 2 cm size, weighed, and packaged into the canisters according to experimental group. The samples are milled for 5 minutes at 25 Hz and then sieved with a cutoff of <1000 µm into weigh boats. The weight of the micronized powder is recorded. The weight of the particles that did not pass through the sieve were also placed in a weigh boat and weighed.

TABLE 3

Effect of Packing on Micronization

| Condition | Micronized Weight (%) |
| --- | --- |
| Super Packed | <10% |
| Moderately Packed | ~70% |
| Lightly Packed | ~50 to 60% |

The moderately packed condition results in the greatest percentage of sample micronized into product while the super-packed condition results in the greatest amount of powder left in the sieve.

Example 6: Particle Size Characterization of Micronized Preparations

The micronized dried ICLs are prepared as described above, and particle size is then evaluated by Laser Light Scattering Particle Sizing Analysis using a Microtrac S3500 tri-laser system. The results of an average of three runs are provided below without delay between tests. The flow rate is 55% and three deaeration cycles are performed before testing wet samples. Dry samples are analyzed using a turbotrac feeder system.

Starting with one gram of each sample, the bulk powder is evaluated for particle size characteristics and porosity. In Sample A, the micronized samples are tested directly. In Sample B, the bulk powder was passed through a 700 to 800 µm sieve. The following values are collected for each sample: MV=mean volume average diameter; MN=mean number average diameter; MA=mean area average diameter; CS=Calculated surface area based upon an assumed spherical geometry; SD=standard deviation; Mz=Graphic Mean provides; σι=Inclusive Graphic Standard Deviation; Ski=Inclusive Graphic Skewness; and Kg=Kurtosis (peakedness) of a distribution.

For wet analysis, approximately 0.625 ml of well mixed sample is wetted with 0.25 ml of 2% Triton X100 surfactant. A 60 ml portion of deionized water is added and the solution stirred by an overhead stir bar while a 1 ml aliquot is removed for sampling.

The particles are further characterized using scanning electron microscopy (SEM) and are observed to comprise flat flakes having individual collagen fibers that retain a native collage structure throughout the process.

TABLE 4

Sample A Particle Size Statistics -Dry
Particle Size Statistics Sample A - Dry

| Data | Value | % tile | Size(μm) |
|---|---|---|---|
| MV(μm): | 235.7 | 10 | 49.66 |
| MN(μm): | 23.74 | 20 | 79.88 |
| MA(μm): | 108.7 | 30 | 112.2 |
| CS: | 0.0550 | 40 | 149.5 |
| SD: | 164.2 | 50 | 191.2 |
| Mz: | 218.5 | 60 | 237.6 |
| σι: | 167.6 | 70 | 291.8 |
| Ski: | 0.343 | 80 | 360.2 |
| Kg: | 1.015 | 90 | 474.8 |
|  |  | 95 | 596.7 |

TABLE 5

Sample A Particle Size Statistics -Wet

| Data | Value | % tile | Size(μm) |
|---|---|---|---|
| MV(μm): | 232.0 | 10 | 50.44 |
| MN(μm): | 19.15 | 20 | 85.75 |
| MA(μm): | 106.6 | 30 | 119.5 |
| CS: | 0.056 | 40 | 153.1 |
| SD: | 155.2 | 50 | 189.5 |
| Mz: | 214.5 | 60 | 231.6 |
| σι: | 160.7 | 70 | 282.0 |
| Ski: | 0.332 | 80 | 347.2 |
| Kg: | 1.075 | 90 | 458.4 |
|  |  | 95 | 579.7 |

TABLE 6

Sample B Particle Size Statistics -Wet

| Data | Value | % tile | Size(μm) |
|---|---|---|---|
| MV(μm): | 264.9 | 10 | 71.72 |
| MN(μm): | 30.29 | 20 | 113.6 |
| MA(μm): | 143.9 | 30 | 148.8 |
| CS: | 0.0420 | 40 | 185.7 |
| SD: | 167.0 | 50 | 230.9 |
| Mz: | 253.8 | 60 | 286.5 |
| σι: | 162.7 | 70 | 345.0 |
| Ski: | 0.2499 | 80 | 404.9 |
| Kg: | 0.883 | 90 | 483.8 |
| Smallest particle (μm) | 14.27 | 95 | 569.2 |
| Largest Particle (μm) | 995.6 |  |  |

TABLE 7

Sample B Particle Size Statistics -Dry

| Data | Value | % tile | Size(μm) |
|---|---|---|---|
| MV(μm): | 304.8 | 10 | 95.63 |
| MN(μm): | 63.88 | 20 | 136.7 |

TABLE 7-continued

Sample B Particle Size Statistics -Dry

| Data | Value | % tile | Size(μm) |
|---|---|---|---|
| MA(μm): | 191.1 | 30 | 179.2 |
| CS: | 0.0310 | 40 | 229.4 |
| SD: | 174.9 | 50 | 283.6 |
| Mz: | 291.7 | 60 | 334.5 |
| σι: | 174.0 | 70 | 384.5 |
| Ski: | 0.1611 | 80 | 441.9 |
| Kg: | 0.920 | 90 | 532.0 |
| Smallest particle (μm) | 28.53 | 95 | 641.4 |
| Largest Particle (μm) | 1184 |  |  |

Example 7: Porosity Characterization of Micronized Preparations

The porosity of microparticles of Sample A described above is examined using mercury intrusion/extrusion. Mercury intrusion/extrusion is based on forcing mercury (a non-wetting liquid) into a porous structure under tightly controlled pressures and can measure pores between 900 μm and 3 nm. In this method, mercury, which is non-wetting for most substances, is forced into voids in the sample by applying external pressure. The pressure required to fill the voids is inversely proportional to the size of the pores. Mercury intrusion/extrusion allows the calculation of total pore volume, total pore area, median pore diameter, bulk density, skeletal density, and percent porosity. The results are presented in Table 8.

TABLE 8

Mercury Intrusion Summary
Intrusion Summary

| Parameters |  |
|---|---|
| Total Intrusion Volume (ml/g) | 1.8927 |
| Total Pore Area (m²/g) | 31.591 |
| Median Pore Diameter-Volume (μm) | 12.8009 |
| Median Pore Diameter-Area (μm) | 0.0054 |
| Average Pore Diameter (μm) | 0.2396 |
| Bulk Density (g/ml) at 0.57 psia | 0.3893 |
| Apparent Density (g/ml) at 59,912.10 psia | 1.4791 |
| Porosity (%) | 73.6798 |
| Stem Volume Used (%) | 55 |

Example 8: Preparation of Collagen Paste

A collagen paste using micronized porcine Collagen Wound Matrix (CWM) as described in Example 4 is prepared as described in U.S. Pat. No. 4,891,359. Collagen pastes are useful to manage irregularly shaped or tunneling wounds, as well as being useful as hemostatic agents.

Two paste consistencies are prepared: a higher percentage of liquid for a thin paste and a lower percentage of liquid for dough like paste. In addition, micronized porcine Collagen Wound Matrix (CWM) two different mesh sizes are used to create the pastes using phosphate buffered saline as provided in Table 9.

TABLE 9

Collagen Pastes

| 40 Mesh | 60 Mesh |
|---|---|
| 90% PBS (w/w) | 95% PBS (w/w) |
| 70% PBS (w/w) | 77% PBS (w/w) |

One gram of milled micronized CWM is prepared as provided in Example 6 and PBS added as provided in Table 10. Samples are mixed to homogenous consistency, less than 1 minute.

TABLE 10

CWM paste components

| Condition Number | Sieve | Powder | Liquid |
|---|---|---|---|
| 1 | 40 Mesh | 1 gram | 9.0 mL PBS |
| 2 | 40 Mesh | 1 gram | 7 mL PBS |
| 3 | 60 Mesh | 1 gram | 9.5 mL PBS |
| 4 | 60 Mesh | 1 gram | 7.7 mL PBS |

Condition 1 results in a very thin paste that has more liquid than powder and does not stick on the skin. Condition 2 produces a thick and doughy paste that can be shaped and does not stick on the skin. The paste of Condition 3 is thicker than the paste of condition 1, but still thin and does not stick on the skin. Condition 4 produces an extremely thick dough like paste that can be easily shaped. The paste of Condition 4 sticks on the skin.

Example 10: Micronized Porcine Collagen Wound Matrix Powder Device

Micronized porcine Collagen Wound Matrix (CWM) as described in Example 4 is provided as a sterile single use powder device intended for the management of wounds. It is a dry, absorbent, white to off-white/pale yellow powder with a particle size distribution of ≤1000 μm. The micronized powder device consists of purified primarily Type I porcine collagen (>95%) in its native form, with less than 0.7% lipids and undetectable levels of glycosaminoglycan (1.0%) and DNA (0.1 ng/μl), and the porcine intestinal collagen is free of cells and cell remnants. The micronized powder device is provided in the following sizes: 100 mg, 500 mg, and 1000 mg.

The micronized powder device aids in creating and maintaining a moist wound environment for an identified wound. It is applied as dry powder which then is hydrated by absorbing wound fluids. Alternatively, the micronized powder device can be hydrated prior to application with an appropriate sterile solution such as sterile saline. The micronized form of the device allows it to conform to uneven or irregularly shaped wounds including tunneling wounds while the collagen matrix absorbs and retains fluid, forming a paste or gel depending on the amount of fluid absorbed. The mixing ratio between the device and wound fluid, or between the device and the sterile solution, can be adjusted to provide an appropriate wound management environment for the type of wound that is being managed. The device does not impact the level of acidity/alkalinity of the fluid that it is hydrated with (measured in terms of the pH of the mixture). These features facilitate achieving the intended effect of maintaining a moist wound environment.

Critical parameters for the micronized powder device are provided in Table 11.

TABLE 12

Critical parameters of micronized porcine CWM powder device

| Parameter | Specification |
|---|---|
| Sizes | 100 mg, 500 mg, 1000 mg |
| Sterilization Method | Gamma Irradiation |
| Shelf Life | 8 Months from Irradiation (approximate) |
| Storage Temperature | Room Temperature |
| Color | White to off-white/pale yellow in color. |

Example 11: Preparation of Micronized Porcine Collagen Wound Matrix Powder Device The micronized porcine CWM powder device of Example 10 is prepared as follows. Porcine intestine tissue from the small intestine of large swine, approximately 450 lb or larger that have been deemed healthy, is acquired following defined procedures which specify the health and age of the animals from which tissue can be collected. The mesenteric fat and membranes are manually removed from the small intestine. The small intestine is then rinsed in hot water (40 to 49° C. [105-120° F.]) and mechanically processed through a series of rollers to remove the inner mucosal and outer muscular layers, leaving a collagenous submucosal layer. The mechanically cleaned submucosa is frozen until subsequent processing.

The mechanically cleaned submucosa is thawed at a temperature of 45 to 55° C. (113 to 131° F.) for 15-45 minutes. The submucosal tube is then slit longitudinally between the lymphatic tags resulting in a sheet. The tissue is then further purified using two separate chemical cleaning steps. The chemical cleaning process removes cells, cell remnants, lipids, DNA, glycosaminoglycan, and epithelial basement membrane components while also inactivating viruses. The process results in a purified collagen sheet.

The chemical cleaning process consists of: (1) incubation for 16 to 20 hours in 100 mM ethylenediaminetetraacetic acid (EDTA) in 10 mM of sodium hydroxide (NaOH) with a pH of 11-12, at a maximum 1.5 μm/1 L ratio and agitated; (2) incubation for 6 to 8 hours in 1M hydrochloric acid (HCl) in 1M sodium chloride (NaCl) at pH 0-1, at a maximum 1.5 μm/1 L ratio and agitated; (3) incubation for 16 to 20 hours in 1M of NaCl in 10 mM phosphate-buffered saline (PBS) at pH 7-7.4; (4) incubation for 2 to 8 hours in 10 mM of PBS alone at pH 7-7.4; and (5) performing two consecutive rinses, each for 2 to 8 hours in sterile water that meets or exceeds USP standards for water for injection. The chemically cleaned intestinal collagen material is frozen at −20° C. in a sealed bag until subsequent processing.

Further processing is performed in a controlled cleanroom environment. The chemically cleaned intestinal collagen is thawed at a temperature of 45 to 55° C. (113 to 131° F.) for 10-20 minutes. The collagen sheets are flattened and inspected for extraneous material and dried at ambient humidity. The dried collagen serves as the base biomaterial for the micronized porcine CWM powder device. To produce the micronized porcine CWM powder device, the dried collagen is milled, packaged, and sterilized with gamma irradiation.

Example 12: Viral Inactivation Validation of Micronized Porcine Collagen Wound Matrix Powder Device The two of the chemical cleaning steps described above in Example 11, (1) the NaOH/EDTA alkaline chelating solution (pH 11-12) incubation step, and (2) the HCl/NaCl acidic salt solution (pH 0-1) incubation step, are tested for viral inactivation against four relevant model viruses. Four model viruses are chosen based on the source porcine material and represent a wide range of physico-chemical properties, DNA-based enveloped and non-enveloped, and RNA-based enveloped and non-enveloped viruses. The tested viruses are Pseudorabies Virus (PRV), Bovine Viral Diarrhea Virus (BVDV), Reovirus-3 (Reo-3) and Porcine Parvovirus (PPV).

As shown in Table 12, the cumulative viral inactivation of the two chemical cleaning steps provides a clearance of greater than $10^6$ for all four model viruses. This data indicates that the chemical cleaning procedure is a robust and effective process that maintains the potential for inactivation of a large variety of viral agents.

TABLE 12

Viral inactivation validation results

| | | Viral Clearance (log reduction) | | |
|---|---|---|---|---|
| Virus | Type | Step 1: NaOH/EDTA | Step 2: HCl/NaCl | Cumulative |
| Porcine Parvovirus | DNA, non-enveloped, icosahedral shape | $3.5 \log_{10}$ | $\geq 6.1 \log_{10}$ | $\geq 9.6 \log_{10}$ |
| Pseudorabies | DNA, enveloped, spherical shape | $\geq 4.7 \log_{10}$ | $\geq 4.7 \log_{10}$ | $\geq 9.4 \log_{10}$ |
| Bovine Viral Diarrhea | RNA, enveloped, pleospherical shape | $\geq 2.8 \log_{10}$ | $4.6 \log_{10}$ | $\geq 7.4 \log_{10}$ |
| Reovirus-3 | RNA, non-enveloped spherical shape | $\geq 4.5 \log_{10}$ | $\geq 6.6 \log_{10}$ | $\geq 11.1 \log_{10}$ |

Example 13: Management of Wounds Using Micronized Porcine Collagen Wound Matrix Powder Device The micronized porcine CWM powder device of Example 10 is used as a single use device for the management of wounds. The micronized porcine CWM powder device is applied weekly from the onset and for the duration of the wound, and is handled using aseptic technique, according to the following five steps:

First, the wound area is prepared using standard methods to ensure that the wound is free of debris and necrotic tissue. If necessary, the wound is surgically debrided to ensure that the wound edges contain viable tissue.

Second, the device is lightly applied over the desired wound area, and if the wound is larger than a single device can cover, multiple devices are applied. Alternatively, the micronized porcine CWM powder is hydrated with sterile solution to form a paste to aid in the application of the device if the location and/or geometry of the wound makes it difficult to apply the dry powder. Hydration is performed by transferring the product into an appropriately sized sterile container, and slowly adding the sterile solution until the desired consistency is obtained. The hydrated device is then applied directly to the wound bed.

Third, a non-adherent dressing is applied to the wound undergoing wound management.

Fourth, a secondary dressing appropriate for the type and stage of the wound is applied over the non-adherent dressing. The non-adherent secondary dressing maintains a moist wound environment, and is chosen based on wound location, size, depth, and patient preference. The secondary dressing is changed as needed to maintain a moist, clean wound area.

Frequency of secondary dressing change depends upon volume of extrudate produced and the type of secondary dressing used.

Fifth, the wound is reevaluated on a weekly basis to assess wound healing. An additional micronized porcine CWM powder device is applied to the wound every week, as needed. Also, if the applied device is no longer covering the wound at any time during the healing process, at least one additional micronized porcine CWM powder device is applied to the wound at that time. As wound healing progresses, sections of the applied device may gradually flake; if needed, the flakes are gently removed during dressing changes. Alternatively, as wound healing progresses, the applied device may transform into a caramel-colored gel; if needed, the gel is rinsed away by gentle irrigation.

Full or near-complete wound healing is achieved for >95% of all wounds is tested by applying the micronized porcine CWM powder device on a weekly basis according to the five-step procedure described above. Wounds are of the following types: partial and full-thickness wounds, pressure ulcers, venous ulcers, diabetic ulcers, chronic vascular ulcers, tunneled/undermined wounds, surgical wounds (e.g., donor sites/grafts, post-Mohs' surgery, post-laser surgery, podiatric, and wound dehiscence), trauma wounds (e.g., abrasions, lacerations, and skin tears), partial thickness burns, and draining wounds. Wound healing is assessed by a visual skin inspection of a wound undergoing wound management, performed on a weekly basis prior to reapplication of the micronized porcine CWM powder device, if needed. Wound healing is divided into four stages, (a) hemostasis, (b) inflammation, (c) proliferation, and (d) remodeling; a wound being managed is determined to be fully healed when visual assessment indicates that the remodeling stage is complete.

What is claimed is:

1. A sterilized micronized collagen composition for use in wound management, the composition comprising micronized particles of a Collagen Wound Matrix (CWM) having a micronized average particle size of 100 to 1000 micrometers (um) in diameter, wherein the composition comprises greater than 95% (w/w) native porcine Type I collagen, wherein the micronized particles are flakes, wherein the composition is for application to a wound, wherein the wound is an irregularly shaped wound or a tunneling wound, and wherein the micronized size of the composition allows direct contact to the entirety of the bed of the wound.

2. The composition of claim 1, wherein the native porcine Type I collagen is free of cells and cell remnants.

3. The composition of claim 1, wherein the CWM has a denaturation temperature determined by differential scanning calorimetry (DSC) of ≥45° C.

4. The composition of claim 1, wherein the composition comprises less than 0.7% (w/w) lipids and less than 1.0% (w/w) glycosaminoglycans.

5. The composition of claim 1, wherein the composition comprises less than 0.1 nanograms per milliliter (ng/ml) DNA.

6. The composition of claim 1, wherein the composition is sterilized by gamma irradiation.

7. The composition of claim 1, wherein the CWM is cross-linked.

8. The composition of claim 1, wherein the composition further comprises an antimicrobial agent.

9. The composition of claim 8, wherein the antimicrobial agent is a cationic antimicrobial agent selected from the group consisting of a quaternary ammonium compound, a bisbiguanide, and a polymeric biguanide.

10. The composition of claim 9, wherein the cationic antimicrobial agent is selected from the group consisting of benzalkonium chloride, cetrimide, chlorhexidine, a chlorhexidine salt, polyhexamethylene biguanide (PHMB), a PHMB salt, polyaminopropyl biguanide (PAPB), a PAPB salt, and any combination thereof.

11. The composition of claim 1, wherein the micronized particles further comprise a polyaminopropyl biguanide coating.

12. The composition of claim 11, wherein the polyaminopropyl biguanide coating comprises polyhexamethylene biguanide (PHMB) present at a concentration selected from the group consisting of less than 0.05% by weight (w/w), between 0.001% and 0.045% (w/w), and between 0.01% and 0.02% (w/w).

13. The composition of claim 1, wherein the micronized particles are wet particles, and wherein the composition further comprises a sterile solution.

14. The composition of claim 1, wherein the composition comprises less than 25 endotoxin units (EU) per 100 milligrams (mg) of micronized particles.

15. The composition of claim 1, wherein the composition further comprises petrolatum or an oil-based carrier.

16. A method for managing a wound in a subject in need thereof comprising
cleaning the wound of debris and necrotic tissue; and
applying a sterilized micronized collagen composition to the entire area of the wound, wherein the composition comprises micronized particles of a Collagen Wound Matrix (CWM) having a micronized average particle size of 1000 micrometers (um) or less in diameter, wherein the composition comprises greater than 95% (w/w) native porcine Type I collagen, wherein the micronized particles are flakes, wherein the wound is an irregularly shaped wound or a tunneling wound, and wherein the micronized size of the composition allows direct contact to the entirety of the bed of the wound.

17. The method of claim 16, further comprising hydrating the composition with sterile saline solution or a biological fluid selected from amniotic suspension, blood, bone marrow aspirate, or platelet rich plasma, to form a paste.

18. A sterilized micronized collagen composition for use in the manufacture of a medicament for wound management, the composition comprising micronized particles of a Collagen Wound Matrix (CWM) having a micronized average particle size of 100 to 1000 micrometers (μm) in diameter, wherein the composition comprises greater than 95% (w/w) native porcine Type I collagen, less than 0.7% (w/w) lipids, less than 1.0% (w/w) glycosaminoglycans, and less than 0.1 nanograms per milliliter (ng/ml) DNA, wherein the native porcine Type I collagen is free of cells and cell remnants, wherein the micronized particles are flakes, wherein the composition is for application to a wound, wherein the wound is an irregularly shaped wound or a tunneling wound selected from the group consisting of a partial thickness wound, a full-thickness wound, a pressure ulcer, a venous ulcer, a diabetic ulcer, a chronic vascular ulcer, a tunneled wound, an undermined wound, a surgical wound, wound dehiscence, a trauma wound, a second degree burn, and a draining wound, and wherein the micronized size of the composition allows direct contact to the entirety of the bed of the wound.

19. The method of claim 16, wherein the irregularly shaped wound or tunneling wound is selected from the group consisting of a partial thickness wound, a full-thickness wound, a pressure ulcer, a venous ulcer, a diabetic ulcer, a chronic vascular ulcer, a tunneled wound, an undermined wound, a surgical wound, wound dehiscence, a trauma wound, a second degree burn, and a draining wound.

20. The method of claim 16, wherein the composition is applied to the wound once weekly until the wound has healed.

21. A sterilized and packaged micronized collagen powder device for use in wound management, the device comprising micronized particles of a Collagen Wound Matrix (CWM) having a micronized average particle size of 100 to 1000 micrometers (μm) in diameter, wherein the device comprises greater than 95% (w/w) native porcine Type I collagen, wherein the micronized particles are flakes, wherein the device is for application to a wound, wherein the wound is an irregularly shaped wound or a tunneling wound, wherein the micronized size of the device allows direct contact to the entirety of the bed of the wound, and wherein the device is situated within one or more packages.

22. The device of claim 21, wherein each of the one or more packages is a single use package.

23. The device of claim 21, wherein each of the one or more packages comprises 100 milligrams (mg), 500 mg, or 1000 mg of the device.

* * * * *